United States Patent
Imamura

(10) Patent No.: US 6,557,682 B2
(45) Date of Patent: May 6, 2003

(54) ONE-WAY CLUTCH

(75) Inventor: Masahiro Imamura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/906,143

(22) Filed: Jul. 17, 2001

(65) Prior Publication Data

US 2002/0029947 A1 Mar. 14, 2002

(30) Foreign Application Priority Data

Jul. 31, 2000 (JP) ........................................ 2000-231155

(51) Int. Cl.$^7$ .............................................. F16D 47/04
(52) U.S. Cl. .................... 192/48.5; 192/46; 192/69.1
(58) Field of Search ................... 192/46, 45.1, 48.5, 192/48.6, 69.1, 85 AA

(56) References Cited

U.S. PATENT DOCUMENTS 5,829,565 A * 11/1998 Fergle et al. ............... 192/45.1
5,918,715 A * 7/1999 Ruth et al. ...................... 192/46
6,125,979 A * 10/2000 Costin et al. ........... 192/103 B
6,332,520 B1 * 12/2001 Costin ........................... 192/46

* cited by examiner

Primary Examiner—Rodney H. Bonck
Assistant Examiner—Eric M Williams
(74) Attorney, Agent, or Firm—Armstrong, Westerman & Hattori, LLP

(57) ABSTRACT

A one-way clutch adapted to be disposed in parallel with a hydraulic friction element includes a first plate adapted to connect to an inner member of the hydraulic friction element and a second plate disposed so as to face the first plate in an axial direction thereof and adapted to connect to an outer member of the hydraulic friction element. The first plate has pocket portions concavely provided in an axially internal surface thereof. The second plate has notched portions concavely provided in an axially internal surface thereof, and pawls are tiltably mounted in the pocket portions of the first plate. The first plate is formed integrally with the inner member of the hydraulic friction element.

4 Claims, 6 Drawing Sheets

ONE-WAY CLUTCH

BACKGROUND OF THE INVENTION

1. Field of the Invention

The present invention relates to a one-way clutch and more particularly to a one-way clutch adapted to be disposed in parallel with a hydraulic friction element which is incorporated in an automatic transmission or the like.

2. Description of the Related Art

The specification of U.S. Pat. No. 5,918,715 discloses as a conventional one-way clutch a plate type one-way clutch comprising a pair of first and second plates facing each other in an axial direction thereof. Pocket portions are concavely provided in an axially internal surface of the first plate, while notched portions are concavely provided in an axially internal surface of the second plate, and pawls are tiltably mounted in the pocket portions. With this structure, when the first plate rotates in one direction relative to the second plate, the pawls are allowed to sink into the pocket portions to thereby permit the first plate to rotate in the one direction relative to the second plate, whereas the relative rotation of the first plate to the second plate in the other direction is prevented by engagement of the pawls with the notched portions.

In addition, there is a case where a one-way clutch is disposed in an automatic transmission in parallel with a hydraulic friction element which is used as a transmission brake, and it is considered that the one-way clutch so disposed is constituted by the aforesaid plate type one-way clutch. FIGS. 6A, 6B show a hydraulic friction element with a one-way clutch of this type. In this one-way clutch, the first plate a and the second plate b of the one-way clutch are brought into spline engagement with an inner member c and an outer member d of the hydraulic friction element, respectively and are disposed so as to face each other in an axial direction thereof. Thus, when the first plate a rotates in a counterclockwise direction as shown in FIG. 6B, relatively to the second plate b, the pawls f mounted in the pocket portions e in the first plate a are allowed to sink into the pocket portions e to thereby permit the first plate a to rotate in the counterclockwise direction relatively to the second plate b, whereas the relative rotation of the first plate a to the second plate b in a clockwise direction is prevented by engagement of the pawls f with the notched portions g in the second plate b.

Here, a hinge portion f1 which is made wider than the other portions of the pawl f is formed at a proximal end of the pawl f which constitutes a forward portion of the pawl f when the first plate rotates in the counterclockwise direction, and a hinge receiving portion e1 which is wider than the other portions of the pocket portion e is formed in the pocket portion e at an end portion which constitutes a forward portion of the pocket portion e when the first plate rotates in the counterclockwise direction, so that the hinge portion f1 is brought into engagement with the hinge receiving portion e1. Accordingly, the pawl f is prevented from being dislocated from the pocket portion e in the clockwise direction when the first plate a rotates in the counterclockwise direction relatively to the second plate b.

With the aforesaid one-way clutch, when the outside diameter of the hydraulic friction element is reduced for miniaturization, the outside diameter of the first plate a is also reduced, and consequently the pocket portions e need to be formed in such a phase that the hinge receiving portions e1 in the pocket portions e coincide with tooth top portions a1 formed on an inner circumference of the first plate a for spline engagement with the inner member c. Here, the hinge receiving portions e1 are portions where restraining torque for preventing the relative rotation of the first plate a to the second plate b in the clockwise direction is inputted via pawls f. Therefore, if the pocket portions e are constructed as described above, sufficient strength cannot be obtained at the portions where the restraining torque is inputted and this facilitates the generation of cracks, the durability being thereby deteriorated.

SUMMARY OF THE INVENTION

The invention was made in view of the above situation, and an object thereof is to provide a plate type one-way clutch which has superior durability.

With a view to solving the problem, according to a first aspect of the invention, there is provided a one-way clutch comprising a pair of first and second plates facing each other in an axial direction thereof, wherein pocket portions are concavely provided in an axially internal surface of the first plate, while notched portions are concavely provided in an axially internal surface of the second plate, and wherein pawls are tiltably mounted in the pocket portions, whereby when the first plate rotates in one direction relative to the second plate the pawls are allowed to sink into the pocket portions to thereby permit the first plate to rotate in the one direction relative to the second plate, whereas the relative rotation of the first plate to the second plate in the other direction is prevented by engagement of the pawls with the notched portions, the one-way clutch being characterized in that the first plate is formed integrally with a rotating member for transmitting power to the first plate.

According to a second aspect of the invention, there is provided a one-way clutch adapted to be disposed in parallel with a hydraulic friction element and comprising a first plate adapted to connect to an inner member of the hydraulic friction element and a second plate disposed so as to face the first plate in an axial direction thereof and adapted to connect to an outer member of the hydraulic friction element, wherein pocket portions are concavely provided in an axially internal surface of the first plate, while notched portions are concavely provided in an axially internal surface of the second plate, and wherein pawls are tiltably mounted in the pocket portions, whereby when the first plate rotates in one direction relative to the second plate the pawls are allowed to sink into the pocket portions to thereby permit the first plate to rotate in the one direction relative to the second plate, whereas the relative rotation of the first plate to the second plate in the other direction is prevented by engagement of the pawls with the notched portions, the one-way clutch being characterized in that the first plate is formed integrally with the inner member of the hydraulic friction element.

According to the invention, the strength of the portions of the first plate where restraining torque is inputted via the pawls is reinforced by the rotating member (the inner member in the second aspect) made integral with the first plate to thereby prevent the generation of cracks, whereby the durability is improved.

DETAILED DESCRIPTION OF THE PREFERRED EMBODIMENT

Figure 1:
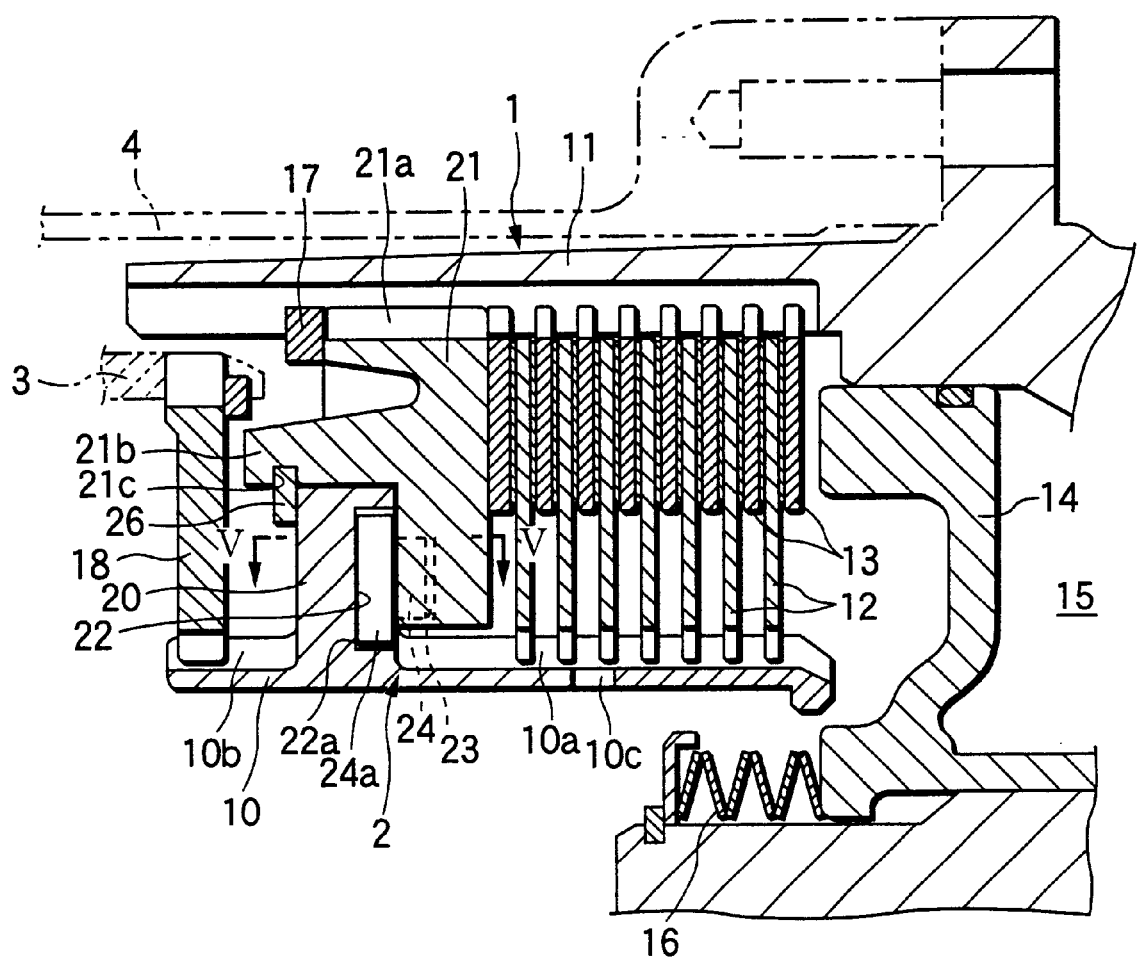
FIG. 1 is a half cross-sectional view of a hydraulic friction element having incorporated therein a one-way clutch according to the invention.

Referring to FIG. 1, reference numeral 1 denotes a hydraulic friction element which is incorporated in an automatic transmission as a transmission brake, and a one-way clutch 2 is disposed in parallel with the element 1. The hydraulic friction element 1 includes a cylindrical inner member 10 connected to a transmission mechanism member 3 such as a ring gear of a planetary gear mechanism, a drum-like outer member 11 fixed to a transmission case 4, a plurality of inner discs 12 which are brought into spline engagement with an outer circumference of the inner member 10, a plurality of outer discs 13 which are brought into spline engagement with an inner circumference of the outer member 11 and a piston 14. The piston 14 is pushed against a return spring 16 when hydraulic pressure is inputted in an oil chamber 15 behind the piston 14, so that the inner discs 12 and the outer discs 13 are brought into friction engagement with each other, whereby the transmission mechanism member 3 is brought to a halt.

Figure 2:
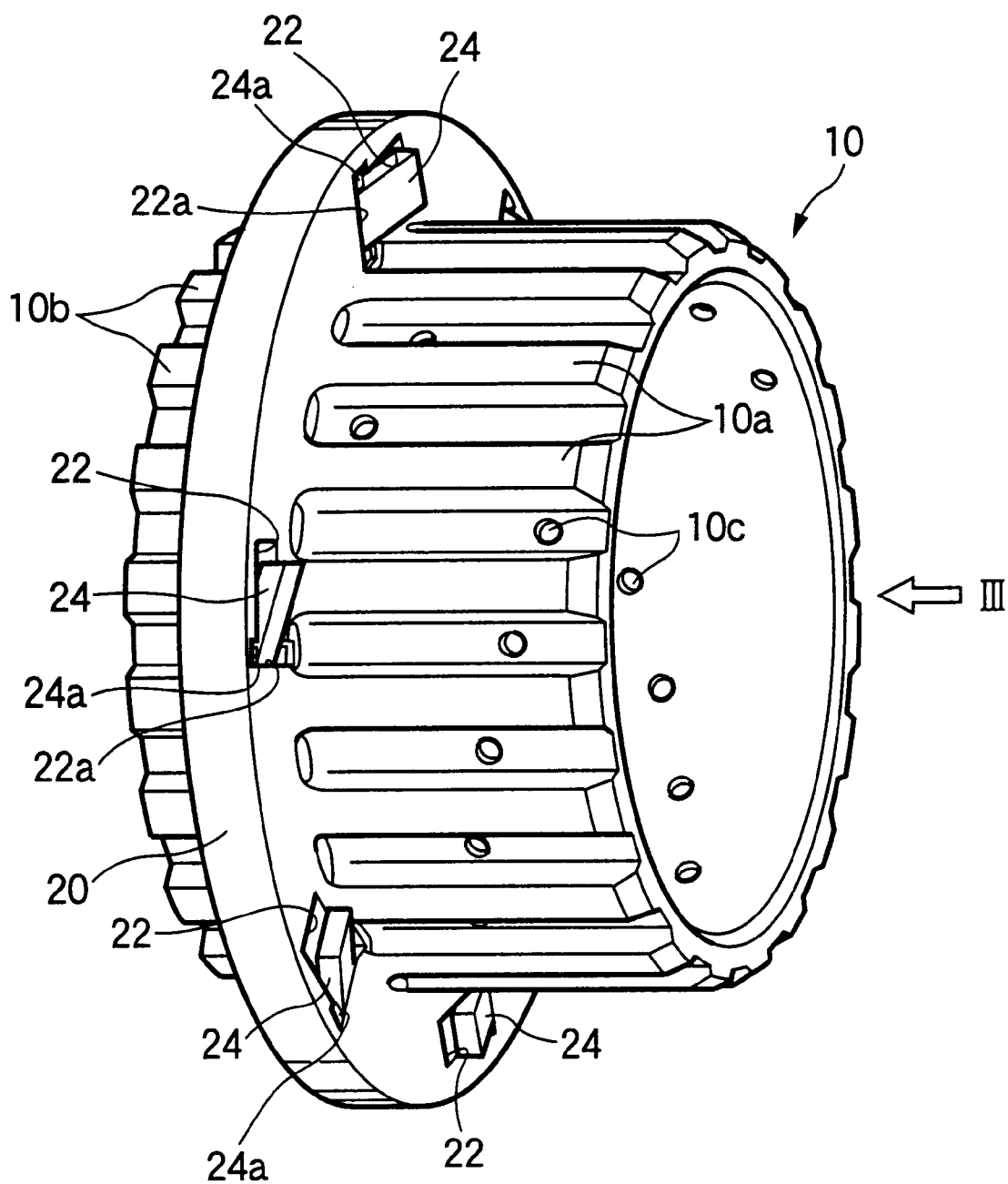
FIG. 2 is a perspective view of an inner member of the hydraulic friction element shown in FIG. 1.
Figure 3:
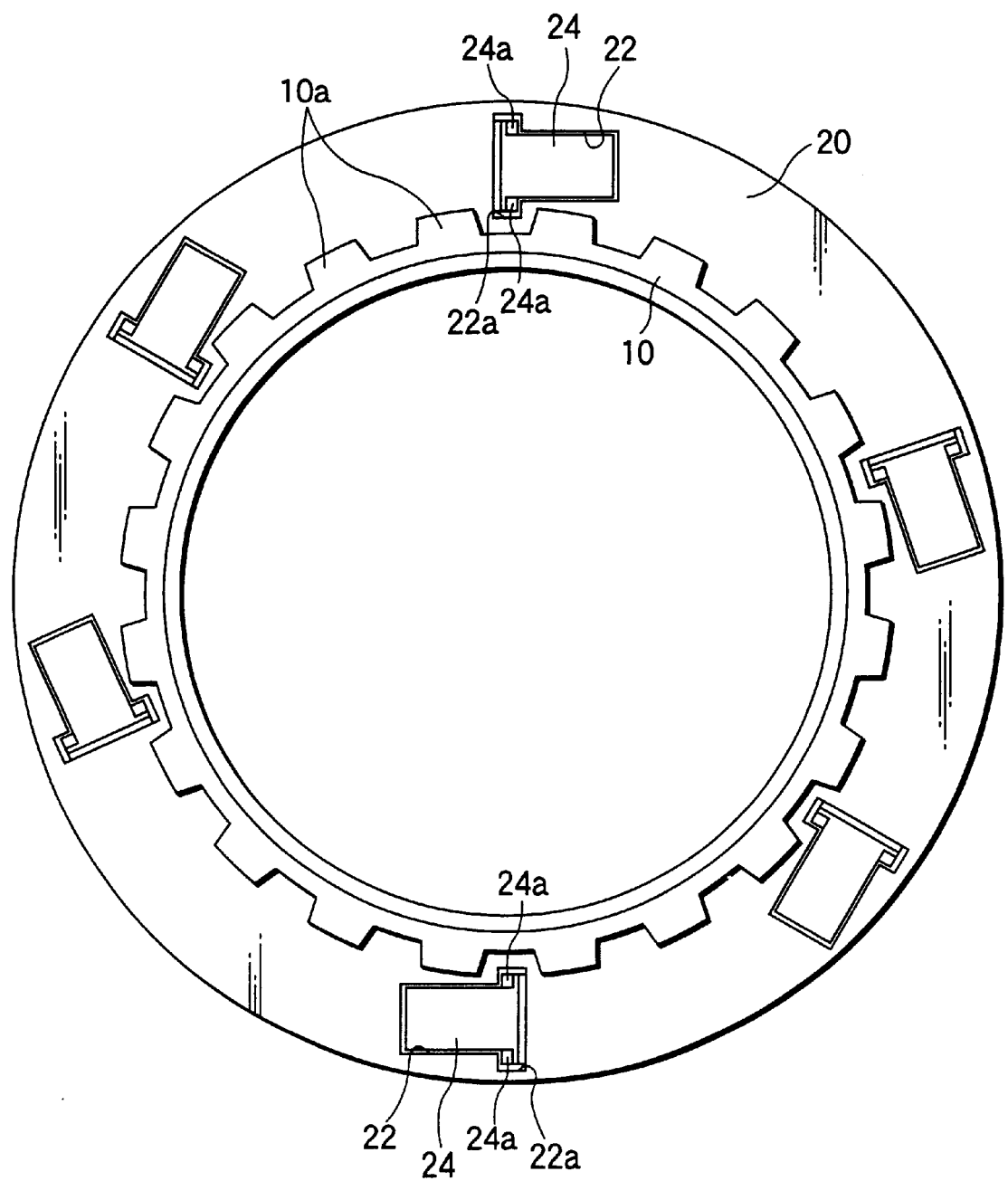
FIG. 3 is a front view of the inner member as viewed from a direction indicated by an arrow III in FIG. 2.
Figure 4:
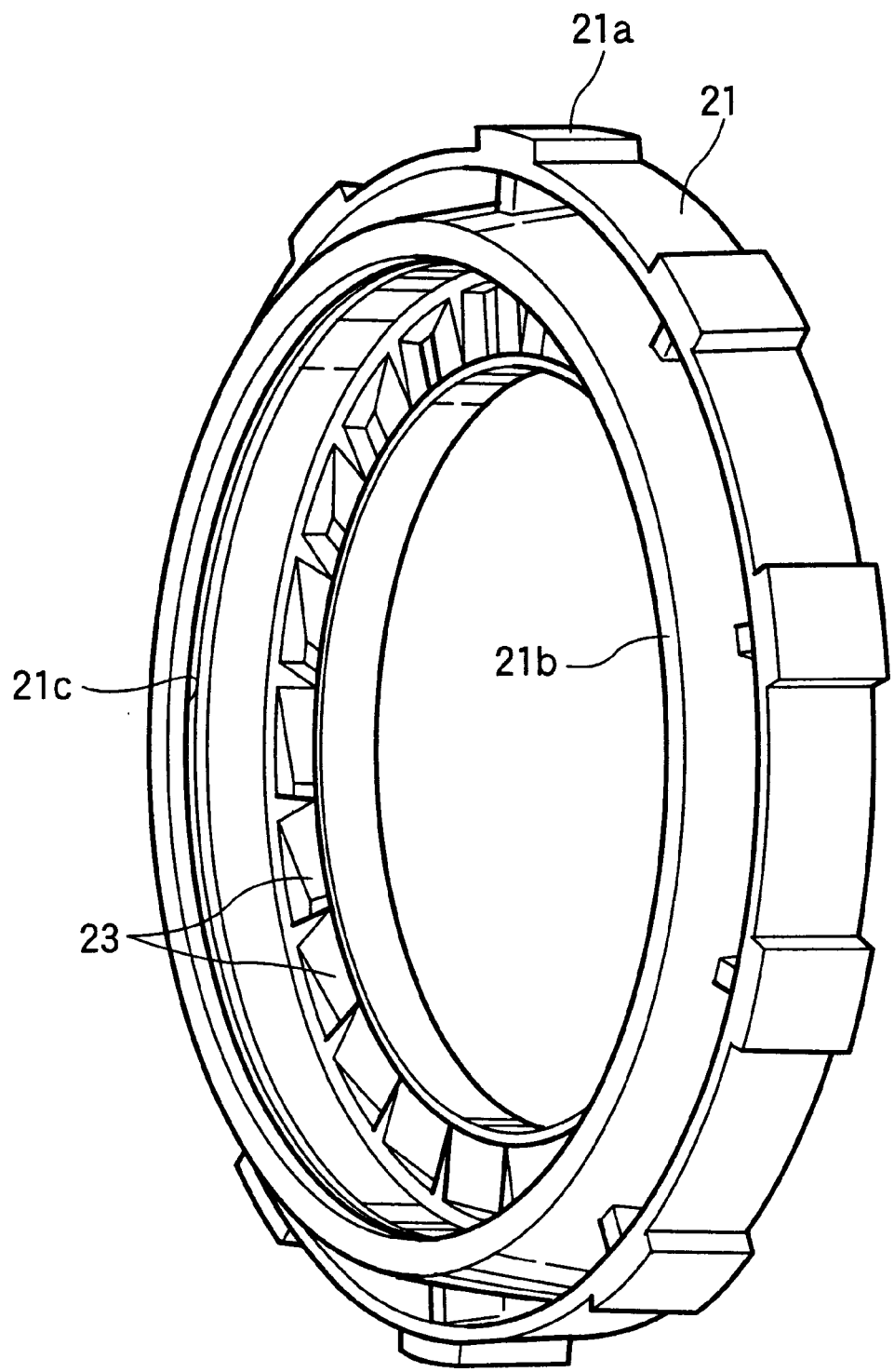
FIG. 4 is a perspective view of a second plate.
Figure 5:
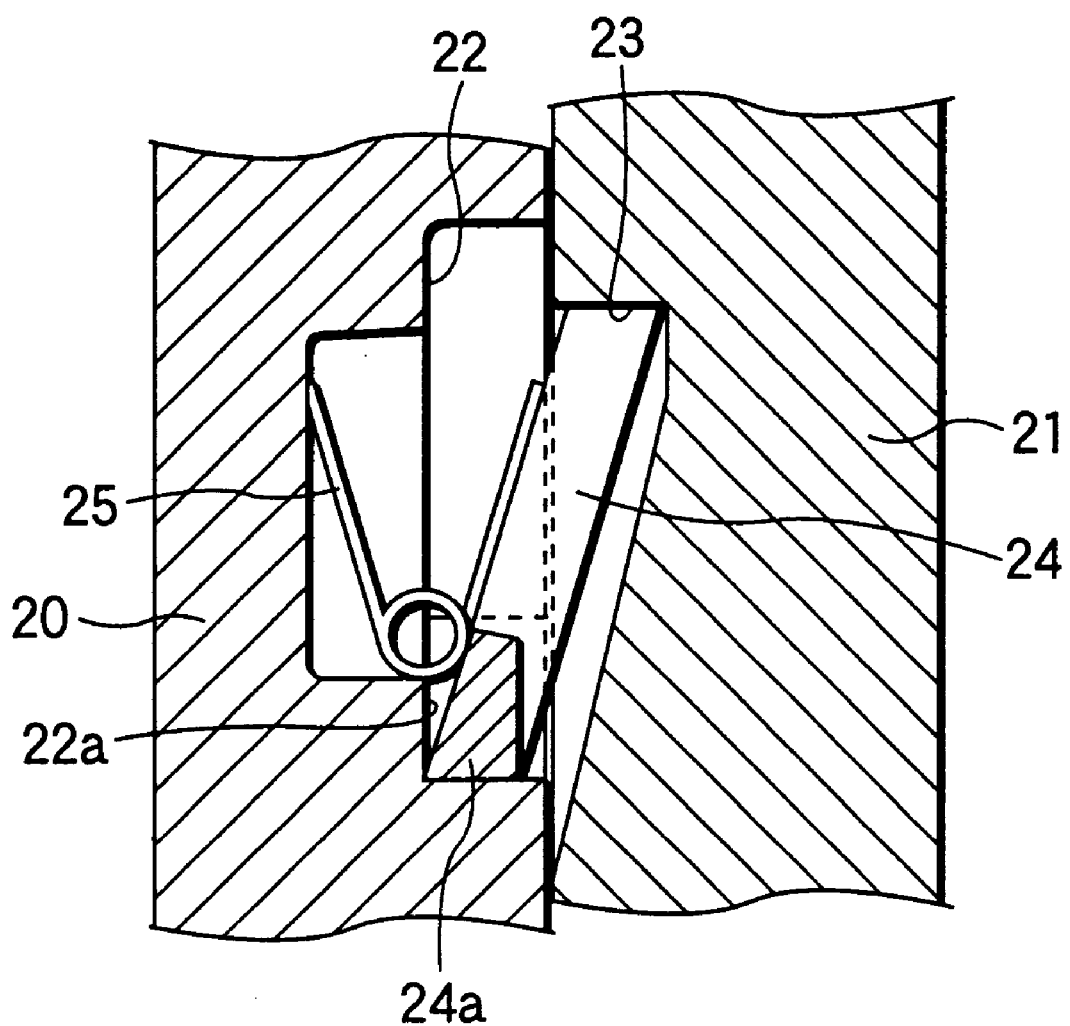
FIG. 5 is an enlarged cross-sectional view taken along the line V—V of FIG. 1.
Figure 6A:
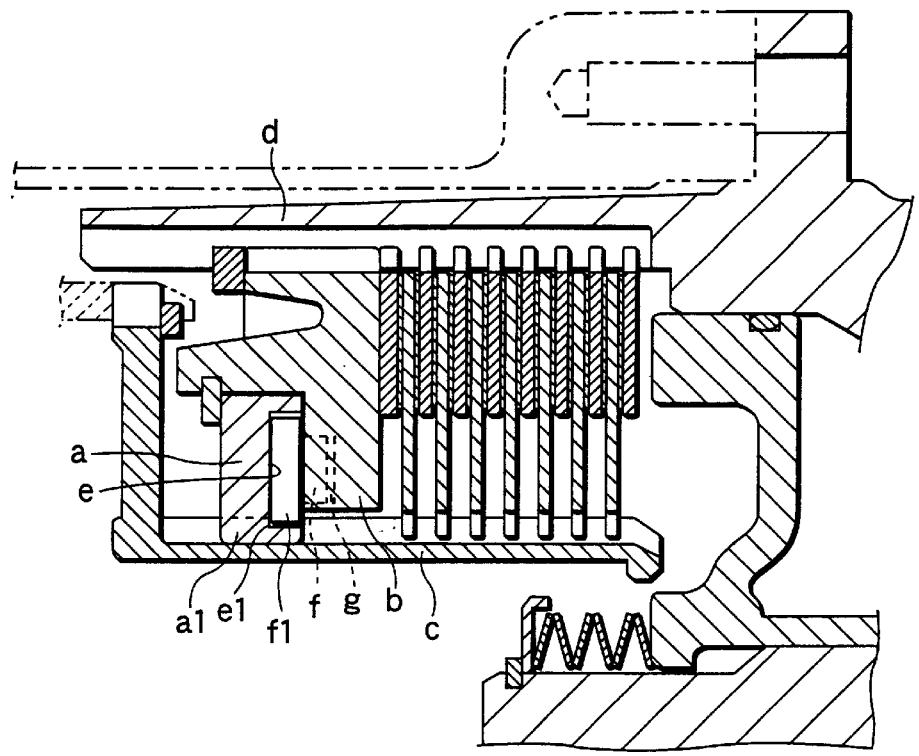
FIG. 6A is a half cross-sectional view of a hydraulic friction element having incorporated therein a one-way clutch for comparison.
Figure 6B:
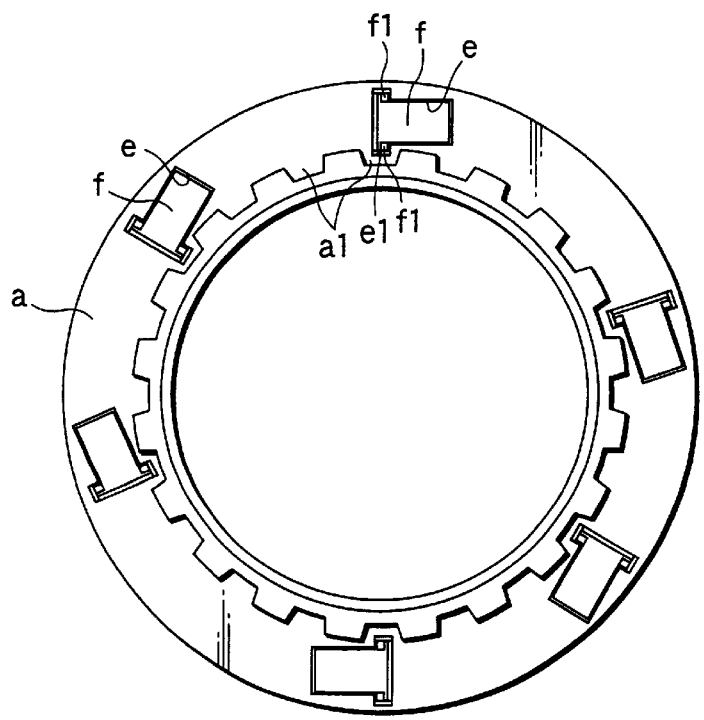
FIG. 6B is a front view of a first plate of the one-way clutch for comparison.

The one-way clutch 2 is constituted by a plate type one-way clutch including a first plate 20 connected to the inner member 10 of the hydraulic friction element 1 and a second plate 21 disposed so as to face the first plate 20 and connected to the outer member 11 of the hydraulic friction element 1. As shown in FIGS. 2 and 3, pocket portions 22 are concavely provided in an axially internal surface (a surface facing the second plate 21) of the first plate 20 at a plurality of circumferential positions, whereas a number of notched portions 23 are concavely provided in an axially internal surface (a surface facing the first plate 20) of the second plate 21 at equal pitches in a circumferential direction thereof, as shown in FIG. 4. Pawls 24 are then mounted in the respective pocket portions 22 tiltably and in such a manner as to be biased toward the second plate 21 with a torsion spring 25 as shown in FIG. 5. Thus, when the first plate 20 rotates relative to the second plate 21 in a counterclockwise direction of FIG. 3, the respective pawls 24 are allowed to sink into the respective pocket portions 22 to thereby permit the relative rotation of the first plate 20 to the second plate 21 in the counterclockwise direction, whereas the relative rotation of the first plate 20 to the second plate 21 in a clockwise direction is prevented by engagement of the respective pawls 24 with the respective notched portions 23.

Additionally, a hinge portion 24a which is made wider than the other portions of the pawl 24 is formed on each of the pawls 24 at a proximal end thereof which constitutes a forward portion when the first plate 20 rotates in the counterclockwise direction, whereas a hinge receiving portion 22a which is made wider than the other portions of the pocket portion 22 is formed in each of the pocket portions 22 at an end thereof which constitutes a forward portion when the first plate 20 rotates in the counterclockwise direction, so that the hinge portions 24a are brought into engagement with the hinge receiving portions 22a, whereby the pawls 24 are prevented from being dislocated from the pocket portions 22 by virtue of friction generated between the pawls 24 and the second plate 21 when the first plate 20 rotates in the counterclockwise direction.

The second plate 21 is a separate unit from the outer member 11 of the hydraulic friction element 1 and is splined to an inner circumference of the outer member 11 at tooth top portions 21a on an outer circumference of the second plate 21. The second plate 21 is locked in an axial direction relative to the outer member 11 with a snap ring 17 mounted on the outer member 11. In addition, an annular projection 21b is formed on the second plate 21 for surrounding the outer circumference of the first plate 20, and the first plate 20 is locked in the axial direction relative to the second plate 21 with a snap ring 26 mounted in a ring groove 21c formed in an inner circumferential surface of the annular projection 21b.

On the other hand, the first plate 20 is formed integrally with the inner member 10 of the hydraulic friction element 1. Namely, the inner member 10 is constituted by the first plate 20, a cylindrical portion extending axially inwardly of the first plate 20 and a cylindrical portion extending axially outwardly of the first plate 20, and the inner discs 12 are splined to the axially inwardly extending cylindrical portion via splines 10a formed on an outer circumference thereof, whereas a connecting plate 18, which is in engagement with the transmission mechanism member 3, is splined to the axially outwardly extending cylindrical portion via splines 10b formed on an outer circumference thereof. The respective pocket portions 22 are concavely provided in the axially internal surface of the first plate 20 in such a phase that the hinge receiving portions 22a in the pocket portions 22 are positioned between pitches at which the splines 10a are formed. In the figure, reference numeral 10c denotes lubricating oil holes formed in the inner member 10.

In this construction, when the first plate 20 is tried to be rotated in a clockwise direction relative to the second plate 21, the pawls 24 are brought into engagement with the notched portions 23 in the second plate 21, whereby restraining torque for preventing the relative rotation of the first plate 20 is inputted in the hinge receiving portions 22a in the pocket portions 22 via the pawls 24. However, as is described in this embodiment, if the first plate 20 is formed integrally with the inner member 10, since the hinge receiving portions 22a, where the restraining torque is inputted are reinforced by the inner member 10, no unreasonable stress is permitted to be exerted on the hinge receiving portions 22a, the durability being thereby secured.

Thus, while the invention has been described as being applied to the one-way clutch 2 disposed in parallel with the hydraulic friction element 1, the invention may be widely applied to one-way clutches which are interposed along power transmission paths. In this case, the first plate of the one-way clutch where the pocket portions are formed may be formed integrally with the rotating member for transmitting power to the first plate to thereby improve the durability thereof.

As is clear from what has been described heretofore, according to the invention, the first plate is formed integrally with the rotating member such as the inner member of the hydraulic friction element for transmitting power to the first plate, whereby the portions of the pocket portions formed in the first plate where the restraining torque is inputted can be reinforced by the rotating member to thereby improve the durability thereof.

What is claimed is:

1. A one-way clutch comprising:

a pair of first and second plates facing each other in an axial direction thereof, said first plate having pocket portions concavely provided in an axially internal surface thereof, said second plate having notched portions concavely provided in an axially internal surface thereof; and pawls tiltably mounted in said pocket portions of said first plate, whereby when said first plate rotates in one direction relative to said second plate, said pawls are allowed to sink into said pocket portions to thereby permit said first plate to rotate in said one direction relative to said second plate, whereas the relative rotation of said first plate to said second plate in the other direction is prevented by engagement of said pawls with said notched portions, wherein said first plate is formed integrally with a rotating member having splines for transmitting power to said first plate, and wherein the pocket portions are concavely provided in such a phase that hinge receiving portions in the pocket portions are positioned between pitches at which the splines are formed.

2. A one-way clutch adapted to be disposed in parallel with a hydraulic friction element, comprising:

a first plate adapted to connect to an inner member of said hydraulic friction element, said first plate having pocket portions concavely provided in an axially internal surface thereof;

a second plate disposed so as to face said first plate in an axial direction thereof and adapted to connect to an outer member of said hydraulic friction element, said second plate having notched portions concavely provided in an axially internal surface thereof; and pawls tiltably mounted in said pocket portions of said first plate, whereby when said first plate rotates in one direction relative to said second plate said pawls are allowed to sink into said pocket portions to thereby permit said first plate to rotate in said one direction relative to said second plate, whereas the relative rotation of said first plate to said second plate in the other direction is prevented by engagement of said pawls with said notched portions, wherein said first plate is formed integrally with said inner member of said hydraulic friction element, and wherein said first plate is formed integrally with a rotating member having splines transmitting power to said first plate, and wherein the pocket portions are concavely provided in such a phase that hinge receiving portions in the pocket portions in the pocket portions are positioned between pitches at which the splines are formed.

3. A one-way clutch and a hydraulic friction element, comprising:

an annular inner member equipped with a plurality of inner disks;

an annular outer member equipped with a plurality of outer disks frictionally engageable with said plurality of inner disks;

a cylindrical first plate connected to said inner member, said first plate having pocket portions concavely provided in an axially internal surface thereof, said first plate being formed integrally with said inner member of said hydraulic friction element;

a second plate connected to said outer member of said hydraulic friction element in such a manner as to face said first plate in an axial direction thereof, said second plate having notched portions concavely provided in an axially internal surface thereof, pawls tiltably mounted in said pocket portions of said first plate whereby, when said first plate rotates in one direction relative to said second plate, said pawls are allowed to sink into said pocket portions to thereby permit said first plate to rotate in said one direction relative to said second plate, whereas the relative rotation of said first plate to said second plate in the other direction is prevented by engagement of said pawls with said notched portions, wherein said first plate is integrally formed on an outer circumference of said annular inner member, the outer circumference of said annular inner member defines first splines for spline engagement with said inner disks and second splines for spline engagement with a connecting plate connecting with a transmission mechanism member, and said first and second splines are disposed opposite to each other with respect to said first plate.

4. A one-way clutch and a hydraulic friction element, comprising:

an annular inner member equipped with a plurality of inner disks;

an annular outer member equipped with a plurality of outer disks frictionally engageable with said plurality of inner disks;

a cylindrical first plate connected to said inner member, said first plate having pocket portions concavely provided in an axially internal surface thereof, said first plate being formed integrally with said inner member of said hydraulic friction element;

a second plate connected to an outer member of said hydraulic friction element in such a manner as to face said first plate in an axial direction thereof, said second plate having notched portions concavely provided in an axially internal surface thereof, pawls tiltably mounted in said pocket portions of said first plate whereby, when said first plate rotates in one direction relative to said second plate, said pawls are allowed to sink into said pocket portions to thereby permit said first plate to rotate in said one direction relative to said second plate, whereas the relative rotation of said first plate to said second plate in the other direction is prevented by engagement of said pawls with said notched portions, wherein said first plate is integrally formed on an outer circumference of said annular inner member, the outer circumference of said annular inner member defines first splines for spline engagement with said inner disks and second splines for spline engagement with a connecting plate connecting with a transmission mechanism member, said first and second splines are disposed opposite to each other with respect to said first plate, wherein said first plate is formed integrally with a rotating member having splines transmitting power to said first plate, and wherein the pocket portions are concavely provided in such a phase that hinge receiving portions in the pocket portions in the pocket portions are positioned between pitches at which the splines are formed.

* * * * *